US008734026B2

(12) United States Patent
Nagengast et al.

(10) Patent No.: US 8,734,026 B2
(45) Date of Patent: May 27, 2014

(54) SUBSEA ELECTRO-OPTICAL CONNECTOR UNIT FOR ELECTRO-OPTICAL ETHERNET TRANSMISSION SYSTEM

(75) Inventors: Kenneth M. Nagengast, Longwood, FL (US); Alan D. McCleary, St. Augustine, FL (US); Huijiang Xi, Maitland, FL (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 119 days.

(21) Appl. No.: 13/586,605

(22) Filed: Aug. 15, 2012

(65) Prior Publication Data
US 2013/0044983 A1 Feb. 21, 2013

Related U.S. Application Data

(60) Provisional application No. 61/525,509, filed on Aug. 19, 2011.

(51) Int. Cl.
*G02B 6/00* (2006.01)
*G02B 6/36* (2006.01)

(52) U.S. Cl.
USPC ............................... 385/77; 385/147; 439/199

(58) Field of Classification Search
USPC .............. 385/77–90, 147; 439/199, 201, 271; 398/116, 139
See application file for complete search history.

(56) References Cited

U.S. PATENT DOCUMENTS

| | | | |
|---|---|---|---|
| 3,792,284 A | 2/1974 | Kaelin | |
| 4,360,729 A | 11/1982 | Harvey et al. | |
| 4,679,250 A | 7/1987 | Davis et al. | |
| 5,171,158 A | 12/1992 | Cairns | |
| 5,645,442 A | 7/1997 | Cairns | |
| 6,179,627 B1 | 1/2001 | Daly et al. | |
| 6,755,575 B2 | 6/2004 | Kronlund et al. | |
| 6,796,821 B2 | 9/2004 | Cairns et al. | |
| 6,917,465 B2 | 7/2005 | Young et al. | |
| 7,224,896 B1 * | 5/2007 | Needle et al. | 398/4 |
| 7,325,983 B1 | 2/2008 | Dallesasse et al. | |

(Continued)

FOREIGN PATENT DOCUMENTS

| | | |
|---|---|---|
| EP | 2354440 | 8/2011 |
| WO | WO2009086632 A1 | 7/2009 |

OTHER PUBLICATIONS

Notification, International Search Report and Written Opinion dated Jan. 4, 2013 for PCT/US2012/051063.

*Primary Examiner* — Akm Enayet Ullah
(74) *Attorney, Agent, or Firm* — Procopio Cory Hargreaves & Savitch LLP (57) ABSTRACT

A subsea connector unit with an integrated, bi-directional electrical to optical (EO) media converter is provided which has a first end configured for connection to standard subsea electrical cable connector unit and a second end joined to a subsea optical or electro-optical ethernet jumper cable. The EO media converter has one or more electrical input/output (I/O) junctions which communicate with electrical signal conductors in a connected electrical ethernet cable and one or more optical I/O junctions which are connected to one or more optical fibers extending from the subsea jumper cable. Electrical input signals received at the electrical I/O junctions are converted into corresponding optical signals provided at the optical I/O junctions for transmission along the subsea jumper cable, and optical input signals received from the jumper cable are converted to electrical signals at the electrical I/O junctions for output to the electrical cable.

33 Claims, 6 Drawing Sheets

(56) References Cited

U.S. PATENT DOCUMENTS

| | | |
|---|---|---|
| 7,331,819 B2 | 2/2008 | Nelson et al. |
| 7,371,014 B2 | 5/2008 | Willis et al. |
| 7,489,438 B1 | 2/2009 | Young et al. |
| 7,539,420 B2 * | 5/2009 | Hesselbom .................. 398/139 |
| 7,555,572 B2 * | 6/2009 | Fischer .......................... 710/11 |
| 7,575,380 B2 | 8/2009 | Wang et al. |
| 7,643,375 B2 | 1/2010 | Behn et al. |
| 7,762,727 B2 * | 7/2010 | Aronson ......................... 385/89 |
| 7,769,265 B2 | 8/2010 | Cairns |
| 8,287,295 B2 | 10/2012 | Sivik et al. |
| 8,292,645 B2 | 10/2012 | Cairns |
| 2002/0159725 A1 | 10/2002 | Bucklen |
| 2003/0161637 A1 * | 8/2003 | Yamamoto et al. ......... 398/167.5 |
| 2004/0033039 A1 * | 2/2004 | Oliveti et al. .................. 385/123 |
| 2004/0184746 A1 | 9/2004 | Chang et al. |
| 2004/0262008 A1 | 12/2004 | Deans |
| 2004/0264879 A1 | 12/2004 | McColloch et al. |
| 2010/0038090 A1 | 2/2010 | Barratt |
| 2011/0044693 A1 * | 2/2011 | Kelly et al. .................... 398/116 |
| 2011/0129187 A1 | 6/2011 | Toth |
| 2012/0159725 A1 * | 6/2012 | Kapoor et al. .................. 15/52.1 |

* cited by examiner

SUBSEA ELECTRO-OPTICAL CONNECTOR UNIT FOR ELECTRO-OPTICAL ETHERNET TRANSMISSION SYSTEM

RELATED APPLICATION

The present application claims the benefit of U.S. provisional pat. App. Ser. No. 61/525,509, filed Aug. 19, 2011, the contents of which are incorporated herein by reference in their entirety.

BACKGROUND

1. Field of the Invention

The present invention relates generally to connection of equipment used in subsea operations, such as equipment used in the subsea oil and gas industry, to shore-based stations, and is particularly concerned with a subsea electrical/optical connector unit for connection between a subsea optical cable and an electrical cable in an ethernet transmission system and method for subsea communications.

2. Related Art

Subsea communication systems generally employ electrical ethernet through electrical telecommunications twisted pair cable, or are purely optical fiber communication systems. Purely electrical systems have some limitations in the subsea environment. Standard electrical input/output interconnects and electrical cables can only step out to a distance of around 50 meters. This is because a 10/100 BaseT ethernet cable has a maximum transmission distance of 100 meters at standard atmospheric pressure, after which the signal begins to degrade to an unrecognizable state. A full fiberoptic communication system overcomes this problem, but requires the land-based operator to convert the electrical input/output signals to optical signals prior to connection to the optical transmission system, both onshore and offshore, adding to the expense of such systems.

There are many types of connectors for making electrical and fiber-optic cable connections in hostile or harsh environments, such as underwater or subsea electrical, optical and hybrid electrical and optical connectors which can be repeatedly mated and demated underwater at great ocean depths. The connectors may be electrical only, optical only, or may be hybrid electrical and optical connectors. These connectors typically consist of releasably mateable plug and receptacle units or connector parts, each attached to cables or other devices intended to be joined by the connectors to form completed circuits. Each connector unit contains one or more electrical and/or optical contacts or junctions for engagement with the junctions in the other unit when the two units are mated together. To completely isolate the contacts to be joined from the ambient environment, one or both parts of these connectors house the contacts in oil-filled, pressure-balanced chambers.

The contacts on one side of a subsea or wet mateable electrical connector are typically in the form of pins or probes, while the contacts or junctions on the other side are in the form of sockets for receiving the probes. Typically, the socket contacts are contained in a sealed chamber containing a dielectric fluid or other mobile substance, and the probes enter the chamber via one or more sealed openings which include seals which exclude seawater and/or contaminants from the contact chamber in the mated and unmated conditions. Such electrical connectors are generally known as pin-and-socket type connectors. One example of an electrical underwater pin and socket connector is described in U.S. Pat. No. 5,645,442 of Cairns and is sold by Teledyne ODI, Inc. of Daytona Beach, Fla. under the name Nautilus®.

SUMMARY

Embodiments described herein provide an electrical-optical (EO) subsea end connector unit configured for connection to a subsea optical or electro-optical cable and having a built-in, bi-directional electrical to optical media converter, and an electro-optical subsea ethernet transmission system and method using the end connector unit for bi-directional communication between subsea optical cables and electrical ethernet cables.

According to one aspect, a subsea electrical-optical end connector unit is provided which has a first end configured for connection to a subsea optical or electro-optical cable or jumper cable and a second end configured for connection to an electrical cable. The connector has a first chamber containing a media converter module having a first or optical input/output junction communicating with optical fibers in an optical cable connected to the first end of the connector unit and a second or electrical input/output junction. Electrical wires or conductors extend between the second input/output junction and the second end of the connector unit and are configured for communication with at least signal carrying electrical wires in an electrical ethernet cable in communication with the second end of the unit. In some cases, the electrical ethernet cable may be a subsea cable, but in other cases it may be regular electrical ethernet cable. The electrical-optical converter connector unit connects to the appropriate counterpart connector, be it a plug or receptacle, which may be mounted on a piece of equipment. In one embodiment, electrical power carrying wires extend from a connected electro-optical cable through at least the first chamber and communicate with electrical power wires in an electrical cable connected to the second end of the unit.

In one embodiment, the first end of the connector unit comprises a cable termination assembly for receiving the end of a subsea optical or electro-optical ethernet cable, with optical fibers from the cable extending into the first chamber and connected to the first input/output junction of the media converter module, while the second end comprises one part of a subsea mateable electrical connector configured for releasable mating engagement with a mating part of the subsea mateable electrical connector at the end of the electrical cable.

According to another aspect, a subsea transmission system comprises at least one subsea optical or electro-optical cable and at least one electrical ethernet cable, and at least a first electro-optical connector unit having a first end connected to one end of the electro-optical cable and a second end connected to one end of the electrical cable. In one embodiment, the subsea optical or electro-optical cable has a second subsea electrical end connector unit at its second end and a second electrical ethernet cable is connected to the second end of the second end connector unit. One or both of the electrical ethernet cables may be regular electrical ethernet cables or subsea electrical ethernet cables. One or more signal-carrying optical fibers extend from the first end of the optical or electro-optical cable into the internal chamber of the first end connector unit and are connected to the first junction of the media converter module, and one or more electrical signal wires or conductors extend from the first junction and communicate with electrical signal wires in the first electrical cable via mated first and second subsea electrical connector units in the second end of the end connector unit and the corresponding end of the first electrical cable, respectively.

In one embodiment, the electro-optical media converter module is enclosed in a reinforced one atmosphere chamber built to withstand the pressure of the surrounding subsea environment. Electrical signal conductors extending from the second subsea electrical connector unit may communicate with the electrical input/output junction of the media converter circuit via a hermetic electrical penetrator which penetrates the wall of the one atmosphere chamber through a sealed opening. Electrical conductors extend from the electrical penetrator to the first junction of the media converter module. The electrical penetrator may be an electrical penetrator as described in U.S. Patent Application Publication No. 2011/0034041 of Teledyne ODI, Inc., the contents of which are incorporated herein by reference.

In another aspect of the invention, an optical or electro-optical ethernet cable or jumper cable is provided having a plug or socket end connector unit at each end of the cable for connection to another cable or having a feedthrough at one end to connect to an equipment housing. One or both of the end connector units may be an underwater electrical to optical connector unit with a built-in electro-optical media converter module. This allows the maximum ethernet transmission distance or step out distance to be increased from fifty meters as in a purely electrical ethernet system to distances up to 40 km. Transmission is bi-directional.

In one embodiment, an electrical to optical end connector unit is provided at both ends of the cable. In this embodiment, an electrical ethernet signal is converted to optical ethernet at a first end connector unit and the optical ethernet signal is provided to the attached end of the jumper cable, transmitted through the cable, and then converted back to an electrical ethernet signal at the electro-optical media converter in the second or far end connector unit. In another embodiment, an electrical-optical connector unit with a built-in electro-optical media converter is located at only one end of the cable, and the opposite end has a standard wet mateable optical or hybrid electro-optical plug or socket connector or feedthrough.

This arrangement allows land-based customers to use standard electrical input/output signals for communication with subsea equipment such as subsea oil and gas installations located up to 40 km offshore, without having to convert over to optical signals on land. Instead, the underwater or subsea electrical to optical connector unit performs all of the required optical conversion, avoiding the cost of placing optical conversion hardware in the land-based equipment.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for a bi-directional electrical to optical end connector unit for a subsea optical or electro-optical ethernet cable allowing releasable connection to an electrical ethernet cable, and an optical ethernet cable comprising a pressure balanced, oil-filled hose with an electrical to optical connector unit at one or both ends of the cable.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

Figure 1:
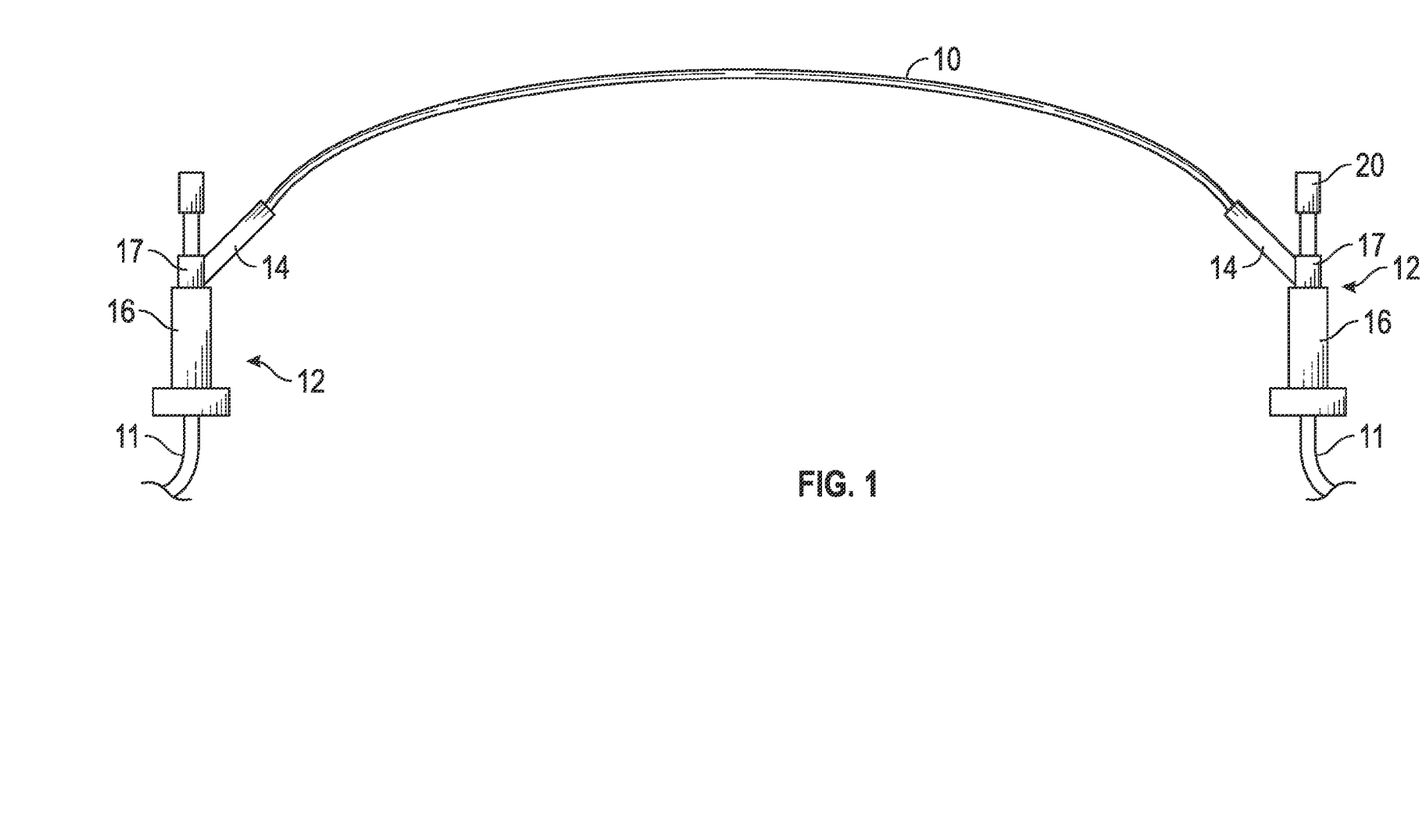
FIG. 1 illustrates one embodiment of a subsea ethernet transmission system with an optical ethernet cable having electrical to optical end connector units at each end of the cable.

FIG. 1 illustrates one embodiment of an optical or electro-optical ethernet cable or jumper cable 10 with integrated subsea electrical to optical end connectors or units 12 secured at each end of the cable. Each connector unit 12 contains an in-built, bi-directional electrical to optical converter module or media converter, as described in more detail below. In alternative embodiments, a connector unit 12 may be provided at one end of the cable only, while the other end is terminated to a standard subsea optical connector or electro-optical hybrid connector or feedthrough fitting. FIGS. 3 to 8 illustrate one embodiment of the electrical to optical connector unit 12 in more detail. The connector unit 12 is configured for making connection to a mating electrical connector unit (not illustrated) at the end of an electrical ethernet cable 11 such as a 10/100/1000 BASE-T cable.

The optical/electro-optical ethernet cable 10 contains one or more ethernet signal carrying optical fibers, which may be single mode or multi-mode fibers, along with two to four electrical power conductor wires (two of which may be redundant), and comprises a cable or a pressure balanced, oil-filled hose designed for subsea communications, such as an oil-filled hose or cable manufactured by Teledyne ODI, Inc. of Daytona Beach, Fla. However, unlike the standard optical ethernet cable which has hose end fittings terminated to optical or electro-optical connector units or feedthroughs, at least one end of cable 10 is terminated to an electrical to optical (EO) connector unit 12 configured for releasable connection to a mating connector unit of an electrical signal carrying ethernet cable 11. In the embodiment of FIG. 1, both ends of cable 10 are terminated to a respective electrical to optical (EO) connector unit 12.

Figure 2:
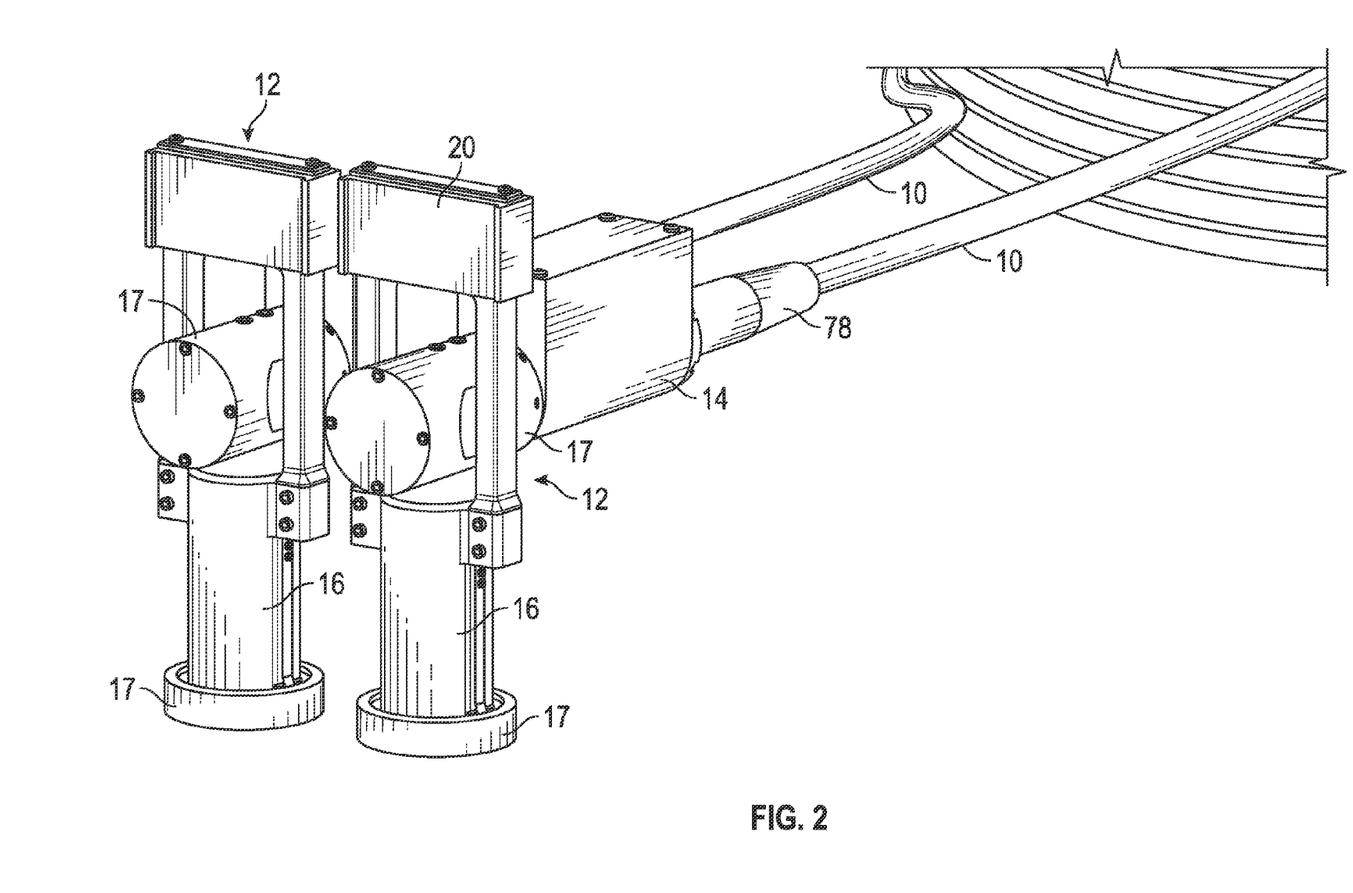
FIG. 2 is an enlarged perspective view of one embodiment of one of the optical ethernet cable end connector units of FIG. 1.
Figure 3:
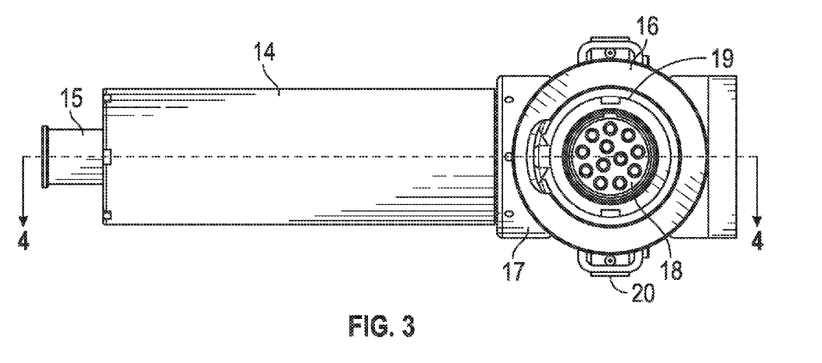
FIG. 3 is a bottom plan view of the end connector unit of FIG. 2.
Figure 4:
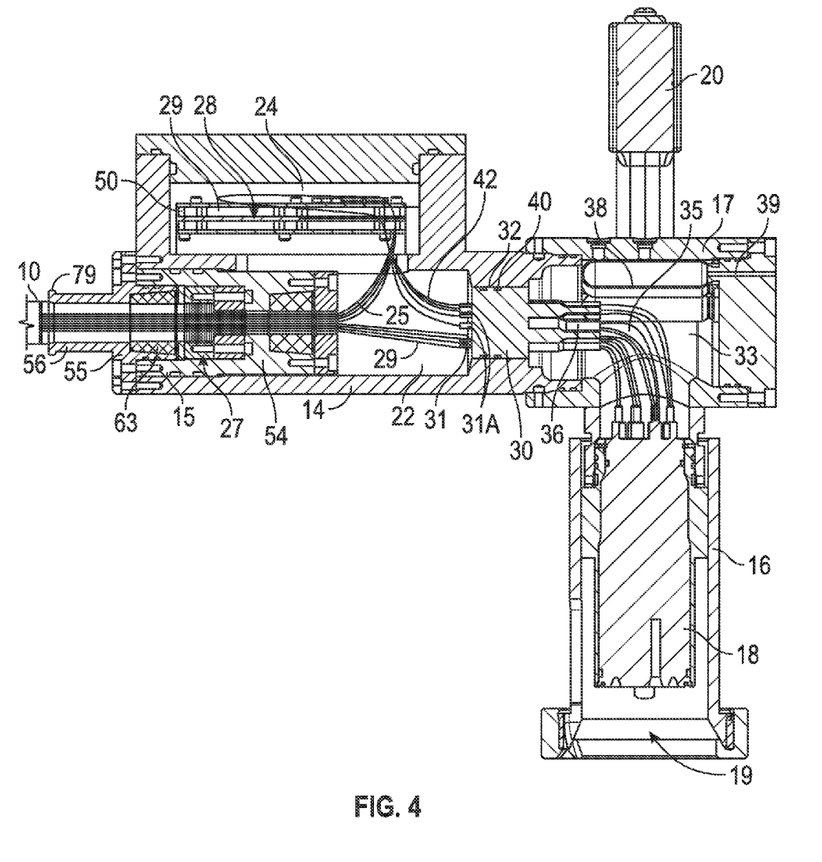
FIG. 4 is a cross sectional view of the cable end connector unit on the lines 4-4 of FIG. 3.

FIG. 2 illustrates the optical or electro-optical ethernet cable or jumper cable 10 of FIG. 1 with electrical to optical connector units 12 at each end in more detail. As best illustrated in FIGS. 2 to 4, in one embodiment each connector unit 12 comprises an outer housing having a first housing portion or module 14 having an optical cable input port 15 for receiving an end of cable 10 and a cable connector portion or module 16 which has an open second end 19 and contains a subsea mateable electrical connector unit or module 18 for releasable connection to a mating electrical connector unit (not illustrated) at the end of electrical cable 11. Electrical connector unit 18 is not shown in detail in FIG. 4 since it may comprise any standard plug or receptacle unit releasably mateable with a mating receptacle or plug unit at the end of an electrical ethernet cable, such as the underwater electrical plug and receptacle connector sold by Teledyne ODI, Inc. of Daytona Beach, Fla. under the name Nautilus®. In this embodiment, connector portion 16 comprises the outer shell of such a plug or receptacle unit.

A second housing or junction portion 17 connects cable connector portion 16 to electrical input port 32 of the first housing portion 14 which contains media converter or bi-directional electro-optical converter module 28, as illustrated in FIG. 4. An ROV grip 20 is secured to the second housing portion 16, as seen in FIG. 2.

Media converter 28 is enclosed within reinforced outer housing 14 sealed from the external subsea environment. The components of circuit or converter 28 may be mounted on a single layer or multi-layer circuit board 29 mounted on a rigid support platform or frame 50 which may be secured to the reinforced walls of housing 14 in any suitable manner. A fiber management device (not illustrated) may be provided for fibers 25 extending between the optical cable input and media converter 28. One example of a suitable fiber management device is described in U.S. Pat. No. 7,769,265 of Cairns. The housing 14 is of high strength material and construction and is suitable for subsea use, and may be of similar construction to the walls of standard subsea equipment enclosures or housings. The first housing portion or module 14 is a reinforced, hermetically sealed one atmosphere housing of high strength material constructed to withstand high external pressure typically encountered in a subsea environment and contains a hermetically sealed atmospheric chamber 22 which may be a one atmosphere chamber.

Figure 5:
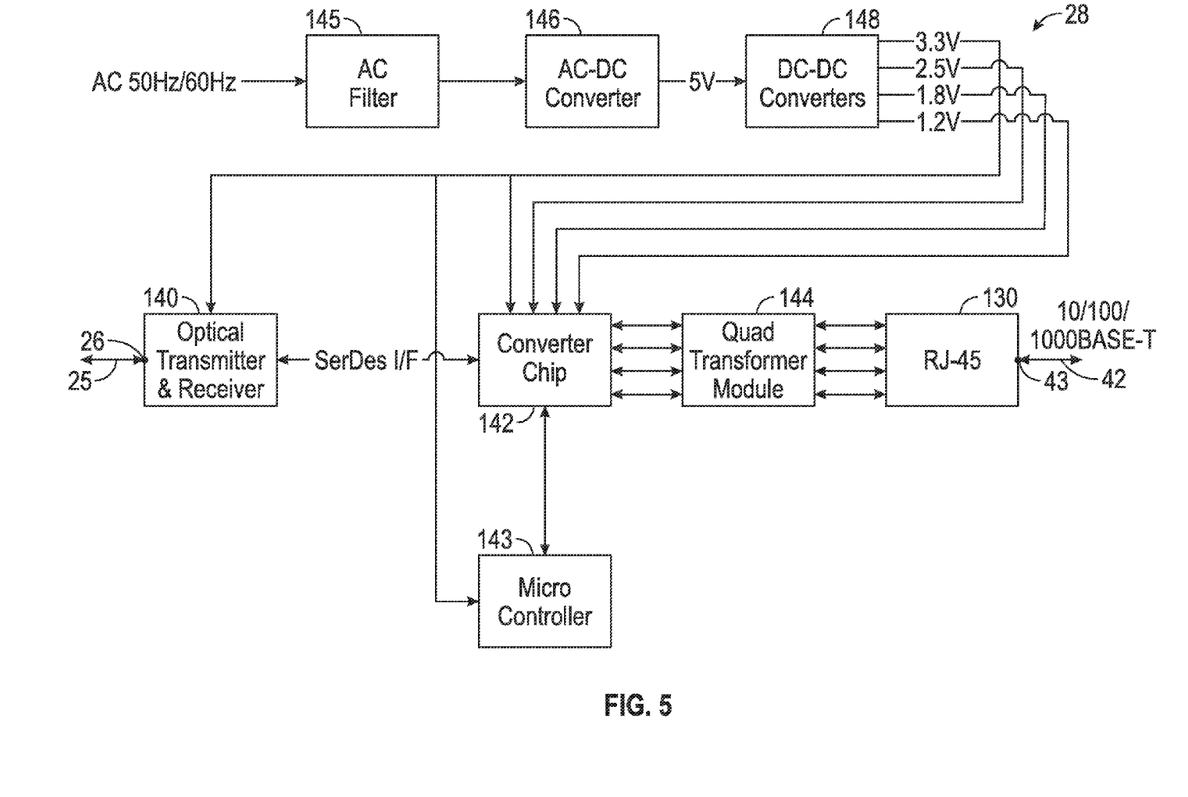
FIG. 5 is a schematic block diagram of one embodiment of the electro-optical media converter of FIG. 4.

Bi-directional optical/electrical media converter is mounted in an upper portion 24 of chamber 22, and is illustrated in more detail in FIG. 5, which is described below. An optical cable termination assembly 27 is mounted in the inlet port 15 of one atmosphere housing 14 and communicates with the lower portion of chamber 22. Single mode or multi-mode optical fiber or fibers 25 entering chamber 22 from optical cable termination assembly 27 are routed to an optical input/output junction 26 of circuit 28, as illustrated in FIGS. 4 and 5. Electrical power wires 29 of optical cable 10 extend directly from optical cable termination assembly 27 through the chamber 22 and are connected to appropriate power carrying pins 31 of an electrical penetrator 30 which is located in sealing engagement with the electrical input/output port 32 of housing module 14 between one atmosphere chamber 22 and a sealed, pressure compensated, oil or mobile substance filled chamber 33 in junction or connection housing portion 17. Chamber 33 extends from the outlet end of plug or receptacle connector module 18 to the electrical penetrator 30. Electrical penetrator 30 may be an electrical penetrator as described in U.S. Patent Application Publication No. 2011/0034041 of Teledyne ODI, Inc., the contents of which are incorporated herein by reference, or any other known type of electrical penetrator.

Although the electrical cable connector portion 16 and second housing or junction 17 are formed separately in the illustrated embodiment, they may be formed as a single or unitary housing in alternative embodiments. Additional, all three portions 14, 17 and 16 may also be formed in a unitary housing in other embodiments.

Electrical connecter module 18 is similar or identical to a standard subsea or wet mateable electrical plug or receptacle connector unit or module, for example a plug or receptacle connector unit as described in U.S. Pat. No. 5,645,442 or 5,171,158 of Cairns, or in U.S. Patent Application Publication No. 2011/0130024 of Cairns, the contents of each of which are incorporated herein by reference, or other such subsea electrical connector units. Connector unit 18 is therefore designed for releasable connection to a mating, standard electrical receptacle or plug connector unit at the end of an electrical ethernet cable 11.

In one embodiment, connector unit 18 comprises a 12 way electrical connector with twelve electrical contacts and associated conductors or electrical wires 35 extend from the contacts through the sealed, pressure compensated, oil or mobile substance filled chamber 33 in second housing portion 17 and up to respective penetration pins or sockets 36 of the penetrator 30, as illustrated in FIG. 4. Some of the wires 35 are signal carrying wires, while others are power carrying wires. The oil-filled chamber 33 is pressure balanced to the surrounding subsea environment via compensation bladder 38 at one end of the chamber which is exposed to the subsea environment via port 39. The electrical penetrator 30 is sealed in connecting passageway or port 32 between the oil-filled chamber 33 and one atmosphere chamber 22 via O-ring seals 40 to form a sealed barrier between the chambers. The power carrying wires which communicate with electrical power carrying wires of a connected electrical cable communicate with penetrator pins 31 connected to the electrical power wires 29 of the optical cable 10. Signal carrying wires which communicate with the signal wires of a connected electrical cable are connected to signal carrying penetrator pins 31A. Electrical signal wires 42 extend in chamber 22 from the penetrator pins 31A to the electrical input/output junction 43 of the media converter or circuit 28 (see FIG. 5).

The electrical to optical media converter circuit or unit 28 is illustrated in more detail in FIG. 5. Circuit 28 converts electrical signals received at an electrical input/output (I/O) port or junction 43 of circuit 28 into optical signals transmitted at optical input/output (I/O) port or junction 26, and converts optical signals received at I/O port 26 into electrical signals at I/O port 43. Although junctions 26 and 43 are shown as single I/O junctions, it will be understood that two or more electrical I/O junctions and optical I/O junctions are provided in some embodiments, depending on the number of separate signal carrying wires and fibers. A controller area network (CAN) bus arrangement may be used for signal communications in circuit 28.

Electrical signal carrying wires of an electrical ethernet cable communicate with the I/O port or junction 43 of converter module or circuit 28 via electrical penetrator 30 which extends through sealed electrical input/output port 32 of one atmosphere housing 14, as noted above. In one embodiment, twelve electrical conductors (four twisted pairs for the electrical ethernet signal, and four power conductors of which two may be redundant) extend from the electrical connector unit 18 through fluid filled chamber 33 to a first end of penetrator 30, and two to four optical fibers 25 extend between the cable termination assembly 18 and the optical input/output junction 26 of the electro-optical converter module, with up to four electrical power conductors or wires 29 extending through chamber 22 from optical cable to the second end of penetrator 30 for electrical communication with the power conductors in electrical cable 11. However, a greater or lesser number of electrical conductors and optical fibers may be provided in alternative embodiments, and the optical fiber may be single mode fiber or multimode fiber.

The circuit basically comprises an optical transmitter and receiver 140 connected to the optical input/output port or junction 26, a bi-directional optical/electrical converter module or chip 142, a micro controller 143 which controls operation of the converter module 142, and a quad transformer module 144 connected to electrical input/output device 130, which may be an RJ-45 connector in one embodiment. An AC power supply (not illustrated) is connected to AC filter 145 which is followed by AC-DC converter 146, and DC-DC converters 148 for the precise voltages needed by the module components, specifically the optical transmitter and receiver 140, the converter chip 142, and the microprocessor or microcontroller 143, as indicated in FIG. 5. AC filter 145 and AC-DC converter 146 are omitted where the power supply is a DC supply voltage. Power supply for media converter 28 may alternatively be provided by power carrying wires of either the electrical or optical cables connected to the unit, and in this case the power carrying wires are connected to DC-DC converter 148.

In one embodiment, the subsea optical CAN bus system described in co-pending U.S. patent application Ser. No. 13/551,346 may be used for conversion of electrical signals to optical signals carried along the optical or electro-optical jumper cable and vice versa, and the contents of U.S. patent application Ser. No. 13/551,346 are incorporated herein by reference in their entirety.

Figure 6:
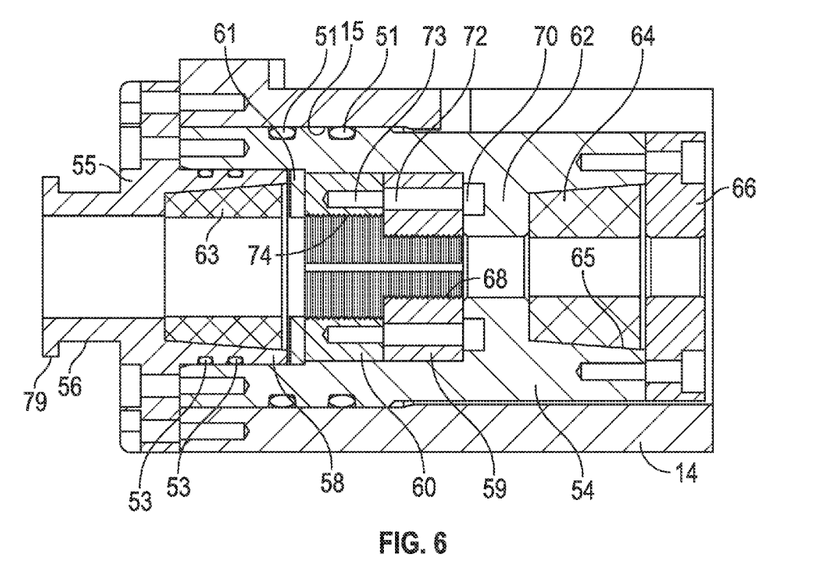
FIG. 6 is an enlarged view of the optical cable termination in the end connector unit of FIGS. 3 to 4.

FIG. 6 is an enlarged cross-sectional view of the optical cable termination assembly 27 which communicates with the one atmosphere chamber 22 of housing portion 14. As illustrated, assembly 27 includes a cable termination sleeve 54 sealably engaged or secured in input port 15 of housing portion 14, a first end cap or gland seal housing or strength member 55 which is bolted to surrounding wall regions of housing portion 14 and to the outer end of sleeve 54, and a second end cap 66 secured to the opposite or inner end of sleeve 54. End cap 55 has a cable input or guide portion 56 and an inwardly directed end portion 58 which captures the cable termination sleeve 54. O-ring seals 53 are provided between an input end portion of sleeve 54 and inwardly projecting end portion 58 of strength member 55. Additional O-ring seals 51 are located between the outer surface of sleeve 54 and the surrounding wall of input port 15. First and second cable grip housings 59, 60 of stepped internal diameter for gripping different layers of a cable are mounted between a first gland seal 63 and spacer 61 at the input end of sleeve 54 and end wall 62 of sleeve 54. A second gland seal 64 is mounted in a recessed end portion 65 of wall 62 and secured in place by end cap 66.

Figure 7:
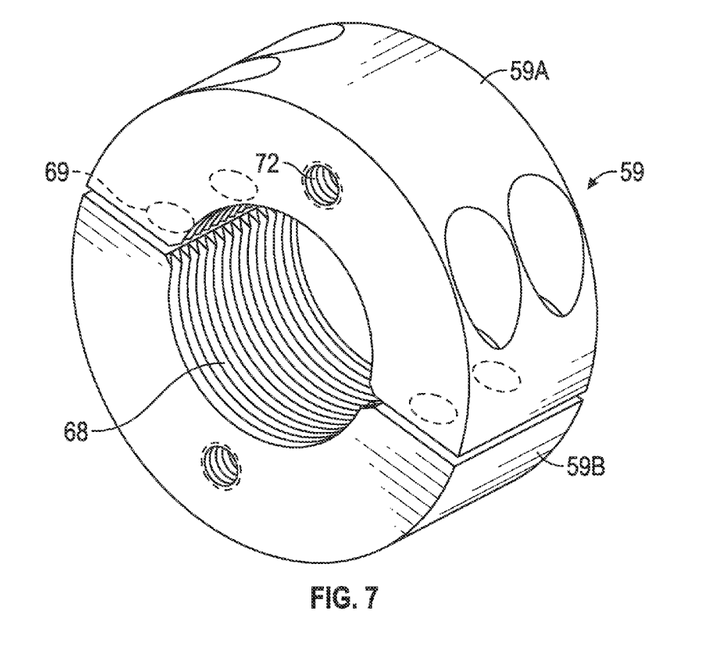
FIG. 7 is an enlarged perspective view of one of the cable grips of FIGS. 4 and 6.

FIG. 7 illustrates the cable grip housing 59 in more detail. Cable grip housing 60 is of substantially identical structure but larger internal diameter. Housing 59 has a threaded through bore 68 designed to grip an outer surface of a cable layer, and is formed in two semi-circular halves 59A and 59B. Grip halves 59A and 59B are clamped together via tightening bolts extending through aligned threaded openings 69 in the end faces of the two halves in a direction perpendicular to the axial direction. The two housings 59,60 are secured together by bolts or screw fasteners 70 extending through aligned threaded bores 72, 73 in each half of the respective housing 59, 60 which extend parallel to the axial direction, as seen in FIGS. 6 and 7. Housing 60 has a threaded through bore 74 of larger diameter than the bore 68 in cable grip housing 59.

Figure 8:
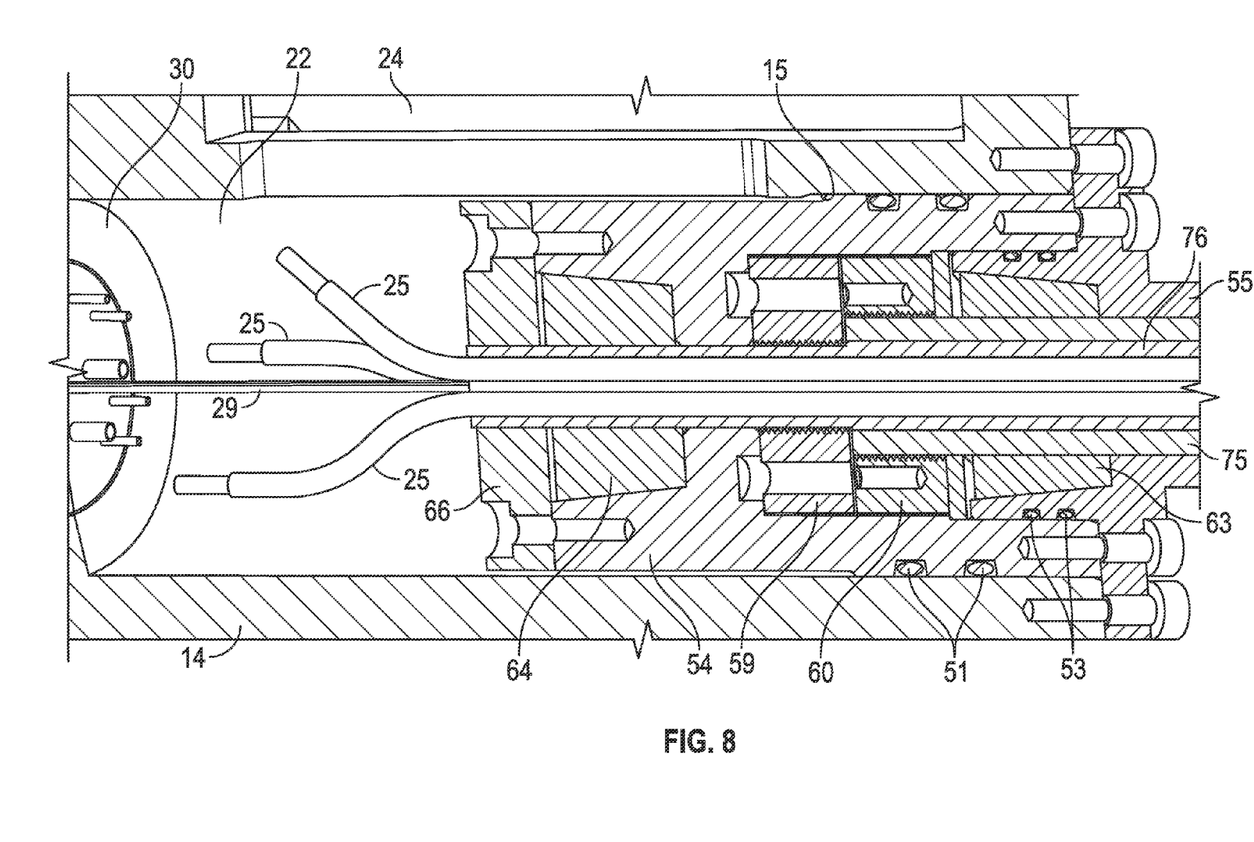
FIG. 8 illustrates an optical cable terminated and in sealing engagement with optical fibers and electrical power wires extending into the sealed chamber inside the connector unit.

FIG. 8 illustrates an end portion of an optical ethernet cable 10 secured in cable termination portion 27. The outer layer 75 of the cable is gripped by the right most cable grip 60. The armor is cleanly pulled away from the cable and is sandwiched in between the two cable grips. The left most cable grip housing 59 grips the inner layer 76 of the cable. The electrical power wires 29 and optical fibers 25 are seen exiting the stripped portion of the cable and entering the one atmosphere chamber 22 to the left of end cap 66. An outer boot seal 78 (see FIG. 2) extends over a length of the cable 10 as well as the outer guide portion 56 of end plate 55, which has a lip 79 which helps to hold the outer boot seal in place.

As noted above, the electrical wires or conductors in each cable include two to four power conductors. In one embodiment, two of the power conductors or electrical wires in the electrical cable connected to end connector 18 carry electrical power up to 600V/5 A for customer use, and communicate via wires 35 and electrical penetrator 30 with power wires 29 in chamber 22. This allows power to be transmitted from connector unit 12 across jumper cable 10. The other two power carrying electrical wires may be connected to two of the wires 42 routed to circuit board 29 to provide power to media converter 28. These electrical wires carry DC electrical power (5VDC/48VDC/10 W in one embodiment), and in this case the AC filter and AC-DC converter of media converter circuit 28 of FIG. 5 are omitted, and the power supply wires are connected to DC-DC converter module 48. The power for the media converter circuit in each end connector unit 12 is supplied in this manner via the electrical ethernet cable connected at that end of the optical ethernet cable.

The cable end connector unit 12 as described above is designed for use as part of a subsea ethernet transmission system and has an integrated, bi-directional electrical to optical media converter 28 which converts electrical ethernet signals provided from a ground-based facility to the subsea connector unit into optical ethernet signals for longer distance subsea ethernet transmission via jumper cable 10. Unit 12 also converts optical signals transmitted back towards the ground-based facility into electrical ethernet signals for transmission via a short range electrical ethernet cable back to the ground-based facility. This avoids the need for the owner of a ground-based facility having to incur the cost of placing optical conversion hardware inside their ground-based equipment in order to step out up to 40 km off shore. Instead, standard electrical input/output signals can be transmitted and received by the ground-based facility for long distance subsea applications such as are needed for telecommunications and the oil and gas industry, with all conversion needed taking place at subsea electrical to optical subsea connector units with built-in, bi-directional electrical/optical converters.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

We claim:

1. A subsea electrical-optical connector unit, comprising:
   a subsea housing containing at least a first chamber having a first port configured for connection to a subsea optical or electro-optical cable and a second port;
   a media converter device mounted in the first chamber;
   a subsea electrical connector module associated with the subsea housing and configured for releasable connection to an electrical ethernet cable;
   the media converter device having at least one optical input/output junction and at least one electrical input/ output junction, and a bi-directional electrical/optical converter module connected between the input/output junctions and configured to convert optical input signals received at the optical input/output junction into electrical output signals at the electrical input/output junction, and to convert electrical input signals received at the electrical input/output junction into optical output signals at the optical input/output junction;

the optical input/output junction communicating with one or more optical fibers extending from a subsea optical or electro-optical cable connected to the first port of the subsea connector unit; and one or more electrical conductors extending from the electrical input/output junction to the electrical cable connector module for communication with at least some of the electrical conductors of an electrical ethernet cable connected to the connector module.

2. The connector unit of claim 1, wherein the first chamber comprises a hermetically sealed, reinforced atmospheric chamber.

3. The connector unit of claim 2, further comprising a hermetic electrical penetrator in sealed engagement with the second port of the atmospheric chamber, the electrical penetrator having opposite first and second ends each having a plurality of electrical contacts, the first end of the penetrator facing the atmospheric chamber.

4. The connector unit of claim 3, further comprising a connector portion between the electrical cable connector module and the second port, the electrical conductors comprising first electrical conductors extending from the electrical input/output junction to the electrical contacts at the first end of the penetrator and second electrical conductors extending from the second end of the penetrator to the electrical cable connector module and communicating with conductors in an electrical cable connected to the cable connector module.

5. The connector unit of claim 1, wherein said housing has a first housing portion containing said first chamber and a second housing portion between the first housing portion and electrical connector module, the second housing portion having a second chamber, and the second port comprises a connecting passageway between first and second chambers.

6. The connector unit of claim 5, wherein the first chamber comprises an atmospheric chamber and second chamber comprises a sealed, pressure compensated chamber filled with a mobile medium, and an electrical penetrator is mounted in sealing engagement with the second port between the first and second chambers, the electrical conductors comprising first electrical conductors extending from the electrical input/output junction to the electrical penetrator and second electrical conductors extending through the second chamber from the electrical penetrator to the electrical cable connector module and communicating with conductors in an electrical ethernet cable connected to the cable connector module.

7. The connector unit of claim 1, further comprising an electro-optical cable termination assembly mounted in sealing engagement with the first port.

8. The connector unit of claim 7, wherein the electro-optical cable termination assembly comprises a cable termination sleeve sealably mounted in the first port and having an outer end, an inner end communicating with said first chamber, and a through bore, first and second cable grips of stepped diameter mounted in the cable termination sleeve, the first cable grip configured to grip an outer surface of a first length of unstripped optical or electro-optical cable extending through a first part of the through bore, and the second cable grip configured to grip an outer surface of an inner layer of a second stripped length of the cable extending from the first, unstripped length towards the inner end of the through bore.

9. The connector unit of claim 8, wherein the cable termination assembly further comprises a first gland seal mounted in the through bore between the outer end and first cable grip and a second gland seal mounted in the through bore between the second cable grip and inner end, the first gland seal being configured for sealing engagement with the outer casing of the unstripped length of the cable extending into the bore, and the second gland seal being configured for sealing engagement with the inner casing of the stripped length of the cable after the second cable grip.

10. The connector unit of claim 1, further comprising one or more electrical power carrying conductors extending directly from a subsea electro-optical cable connected to the first port through the first chamber and communicating with corresponding electrical power carrying conductors in an electrical cable connected to the subsea electrical connector module.

11. The connector unit of claim 1, wherein the media converter device further comprises a power supply module configured to supply power to the electrical-optical converter module.

12. The connector of claim 11, wherein the power supply module has a power input junction and one or more electrical power conductors extend from the power input junction through the first chamber for communication with one or more of the electrical power conductors of an electrical ethernet cable connected to the subsea electrical connector module.

13. The connector unit of claim 1, wherein the subsea electrical connector module comprises a first mateable part of a releasably mateable subsea electrical connector configured for releasable subsea mating engagement with a second mateable part at the end of an electrical ethernet cable, one of said mateable parts comprising a plug unit having projecting electrical conductor pins and the other mateable part comprising a receptacle unit having sealed electrical contact sockets configured for engagement with said electrical conductor pins in the mated condition of the subsea electrical connector.

14. An underwater electrical to optical connector unit, comprising:

a single or multi-part outer housing having a first cable inlet port configured for sealed connection to the end of a subsea optical or electro-optical ethernet cable and a second end, the housing having at least one sealed chamber and being constructed to withstand the pressure of the surrounding subsea environment;

an electrical cable connector portion at the second end of the housing configured for releasable connection to mating connector portion at the end of an electrical ethernet cable;

a bi-directional electro-optical converter mounted in the sealed chamber and having a first junction for input and output of optical signals and a second junction for input and output of electrical signals;

a plurality of electrical wires extending from the cable connector portion to the second junction for electrical signal communication between the second junction and an electrical ethernet cable connected to the electrical connector portion;

one or more optical fibers extending from the first junction to the first end of the housing for optical signal communication between the first junction and a subsea optical or electro-optical cable connected to the first end of the housing; and the electro-optical converter being configured to convert incoming optical signals from the subsea optical or electro-optical cable into electrical signals for communication with the electrical ethernet cable, and to convert incoming electrical signals into optical signals for communication with the optical or electro-optical ethernet cable.

15. The connector unit of claim 14, wherein the housing has a first, reinforced housing portion containing the first internal chamber, the first housing portion including the first inlet port and a second port both communicating with the first internal chamber, and the first internal chamber comprising a sealed one atmosphere chamber.

16. The connector unit of claim 15, wherein the housing further comprises a second housing portion between the first housing portion and cable connector portion, the second housing portion having a second internal chamber containing a pressure-balanced fluid medium, and a sealed barrier between the first and second internal chambers having sealed electrical penetrators extending through the barrier.

17. The connector unit of claim 14, wherein the optical ethernet cable is a pressure balanced, oil-filled hose.

18. A subsea ethernet signal transmission system comprising:
   at least one subsea optical or electro-optical cable having first and second ends;
   at least one electrical ethernet cable; and
   at least a first subsea electro-optical connector unit having a first end connected to the first end of the optical or electro-optical cable and a second end connected to one end of the electrical cable, the connector unit having a subsea housing containing an atmospheric chamber and a media converter device mounted in the atmospheric chamber;
   the media converter device having at least one optical input/output junction and at least one electrical input/output junction, and a bi-directional electrical/optical converter module connected between the input/output junctions and configured to convert optical input signals received at the optical input/output junction into electrical output signals at the electrical input/output junction, and to convert electrical input signals received at the electrical input/output junction into optical output signals at the optical input/output junction;
   one or more signal-carrying optical fibers extending from the first end of the optical or electro-optical cable into the atmospheric chamber of the first end connector unit and connected to the first junction of the media converter module; and
   one or more electrical signal wires or conductors extending from the second junction and communicating with electrical signal wires in the first electrical cable.

19. The system of claim 18, further comprising a second electro-optical end connector unit connected to the second end of the optical or electro-optical cable, and a second electrical cable releasably connected to the second end of the second electro-optical end connector unit.

20. The system of claim 19, wherein the optical or electro-optical cable comprises an electro-optical jumper cable carrying a plurality of optical signal carrying fibers and one or more power carrying electrical wires, at least one of the power carrying electrical wires extending from the first cable inlet port and communicating with corresponding power carrying electrical wires in the electrical cable, whereby power is transmitted across the electro-optical jumper cable to transmit power between electrical cables connected to opposite end connectors of the electro-optical cable.

21. The system of claim 18, further comprising a wet mateable optical or hybrid electro-optical plug or socket connector connected to the second end of the optical or electro-optical cable.

22. The system of claim 20, wherein the media converter device has a power input junction and at least one of the power carrying electrical wires in the electro-optical cable or electrical cable is connected to the power input junction to supply power to the media converter device.

23. The system of claim 18, wherein the atmospheric chamber has a first port at the first end of the connector unit and a second port, the connector unit further comprising a hermetic electrical penetrator in sealed engagement with the second port of the atmospheric chamber, the electrical penetrator having opposite first and second ends each having a plurality of electrical contacts, the first end of the penetrator facing the atmospheric chamber.

24. The system of claim 23, wherein the connector unit further comprises a connector portion between the electrical cable connector portion and the second port, the electrical signal conductors comprising first electrical conductors extending from the electrical input/output junction to the electrical contacts at the first end of the penetrator and second electrical conductors extending through the second connector portion from the second end of the penetrator to the electrical cable connector portion and communicating with conductors in an electrical cable connected to the cable connector portion.

25. The system of claim 23, wherein said outer housing has a first housing portion containing said first chamber and a second housing portion between the first housing portion and electrical cable connector portion, the second housing portion having a second chamber, and the second port comprises a connecting passageway between first and second chambers.

26. The system of claim 25, wherein the second chamber comprises a sealed, pressure compensated chamber filled with a mobile medium.

27. The system of claim 18, wherein the first end of the subsea housing comprises a first port and the connector unit further comprises an electro-optical cable termination assembly mounted in sealing engagement with the first port, the end of the optical or electro-optical cable being secured in sealing engagement with the cable termination assembly.

28. The system of claim 18, wherein the subsea electrical connector portion of the connector unit comprises a first mateable part of a releasably mateable subsea electrical connector and said one end of said electrical cable comprises a second part of a releasably mateable subsea electrical connector which is in releasable subsea mating engagement with the first mateable part, one of said mateable parts comprising a plug unit having projecting electrical conductor pins and the other mateable part comprising a receptacle unit having sealed electrical contact sockets configured for engagement with said electrical conductor pins in the mated condition of the subsea electrical connector.

29. An electro-optical ethernet transmission method, comprising:
   releasably connecting a first subsea electrical-optical end connector unit at a first end of a subsea jumper cable comprising an optical or electro-optical cable to the end of an electrical cable;
   communicating input electrical signals from the electrical cable to one or more electrical signal input/output (I/O) junctions of a bi-directional electrical/optical converter device in the first subsea electrical-optical end connector unit;

converting the input electrical signals from the electrical cable to optical signals and providing the converted optical signals to one or more optical signal I/O junctions of the electrical/optical converter device;

communicating the converted optical signals to the subsea jumper cable for subsea transmission to a second end of the jumper cable;

communicating input optical signals from the subsea jumper cable to the one or more optical signal I/O junctions of the electrical/optical converter device;

converting the input optical signals into electrical signals and providing the converted electrical signals to the one or more electrical signal I/O junctions of the electrical/optical converter device; and communicating the converted electrical signals to the electrical cable for transmission to equipment connected to the electrical cable.

30. The method of claim 29, further comprising communicating electrical power from at least one electrical power carrying conductor in one of the cables to a power input junction of the electrical/optical converter device to supply power to the components of the device.

31. The method of claim 29, further comprising connecting a second electrical cable to a second subsea electrical-optical end connector unit at the second end of the subsea jumper cable, the second subsea electrical-optical end connector unit containing a second electrical/optical converter device identical to said one electrical/optical converter device, converting optical signals transmitted from the first end connector unit to the second end of the jumper cable into corresponding electrical signals in the second electrical/optical converter device and submitting the resultant electrical signals to the second electrical cable, whereby signals can be transmitted subsea between two electrical cables along the optical signal carrying jumper cable which is longer than an electrical cable.

32. The method of claim 31, further comprising connecting one or more electrical power conductors in the first electrical cable through the first end connector unit to one or more corresponding electrical power conductors in the subsea jumper cable, and connecting the one or more electrical power conductors in the subsea jumper cable through the second end connector unit at the second end of the subsea jumper cable to one or more corresponding electrical power conductors in the second electrical cable, whereby power is transmitted between the electrical cables across the jumper cable.

33. The method of claim 29, wherein one of the electrical cables communicates with a ground-based facility for transmission of electrical ethernet signals from the ground based facility to the subsea electrical-optical and connector unit and from the subsea electro-optical end connector unit to the ground-based facility.

* * * * *